(12) United States Patent
Hong

(10) Patent No.: US 12,481,857 B1
(45) Date of Patent: Nov. 25, 2025

(54) RFID ASSEMBLY

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 18/909,944

(22) Filed: Oct. 9, 2024

(51) Int. Cl.
*G06K 19/06* (2006.01)
*G06K 19/077* (2006.01)

(52) U.S. Cl.
CPC ................ *G06K 19/07749* (2013.01)

(58) Field of Classification Search
CPC ............ G06K 19/07749; G06K 19/07; G06K 19/077; G06K 19/07775; G06K 19/041
USPC ......................................................... 235/492
See application file for complete search history.

(56) References Cited

U.S. PATENT DOCUMENTS

| 12,045,682 | B1 * | 7/2024 | Hong | G09F 3/0335 |
| 2020/0334511 | A1 * | 10/2020 | Schoening | G06K 19/07749 |
| 2021/0206406 | A1 * | 7/2021 | Sato | B60B 37/06 |
| 2022/0277183 | A1 * | 9/2022 | Turki | G06K 19/07773 |

FOREIGN PATENT DOCUMENTS

| EP | 3909901 | * | 11/2021 | G06K 19/045 |
| WO | 2021028792 | * | 2/2021 | A61B 90/98 |

* cited by examiner

*Primary Examiner* — Daniel St Cyr
(74) *Attorney, Agent, or Firm* — Apex Juris, pllc; Hilde M. L. Coeckx

(57) ABSTRACT

A RFID assembly includes a RFID engagement device and an object. The object has an engagement hole including an expanded portion and an insertion portion connected in sequence. A main body of the RFID engagement device includes a head and a body that are connected. The body is inserted into the insertion portion. A RFID structure fits into the head. The head is at least partially placed in the expanded portion. A diameter of the expanded portion is slightly greater than a diameter of the head. Therefore, the head of the RFID engagement device could be sunk in the surface and a bottom side of the head does not protrude out of the expanded portion, so that the head is prevented from being lifted due to collision with a foreign object which is in contact with an inner side of the head.

9 Claims, 11 Drawing Sheets

RFID ASSEMBLY

BACKGROUND OF THE INVENTION

Technical Field

The present invention relates generally to a device of a radio-frequency identification system, and more particularly to a RFID assembly.

Description of Related Art

Nowadays, radio-frequency identification has been widely applied to production end, asset management end, and user end. Through writing and reading a radio-frequency identification label, information could be recorded on an object attached by the radio-frequency identification label, so that the information related to the object is stored in the radio-frequency identification label for subsequent use.

The radio-frequency identification (RFID) label includes a sticker configuration and a tag configuration, wherein the radio-frequency identification (RFID) label is disposed on the object through sticking or hanging. Although the radio-frequency identification (RFID) label with the tag configuration could be hanged on the object such as a hand tool, the radio-frequency identification (RFID) label hanged on the hand tool might obstruct operation. Therefore, the conventional radio-frequency identification (RFID) label still has room for improvement, wherein the radio-frequency identification (RFID) label should be easily readable by a user and should not obstruct operation by excessively protruding from the object.

BRIEF SUMMARY OF THE INVENTION

In view of the above, the primary objective of the present invention is to provide a RFID assembly including a RFID engagement device and an object, wherein the RFID engagement device is not loosened easily due to external force or collision after being inserted into the object, so that a RFID structure of the RFID engagement device could be firmed attached on the object for a user to read or write information.

The present invention provides a RFID assembly including a RFID engagement device and an object. The RFID engagement device includes a main body and a RFID structure. The main body has an axial line and includes a head and a body that are connected to each other along the axial line. The head has a receiving groove. The RFID structure has an insulating carrier. The insulating carrier fits into the receiving groove and encloses a RFID circuit module. The object has a surface. The surface has an engagement hole. The engagement hole has a hole axis and includes an expanded portion and an insertion portion that are connected to each other along the hole axis. The expanded portion is adjacently connected to the surface. The body of the main body is inserted into the insertion portion. The head is at least partially placed in the expanded portion. A ratio of a diameter of the expanded portion to a diameter of the head is greater than or equal to 1.0312 and is less than or equal to 1.0625.

With the aforementioned design, the RFID structure is attached on the object through inserting the main body into the engagement hole of the object, so that the information stored in the RFID circuit module could be read by the RFID read/write device. The diameter of the expanded portion is slightly greater than the diameter of the head. In this way, when the main body is engaged with the object, the head could be sunk in the surface and the bottom side of the head does not protrude out of the expanded portion, so that the head could be prevented from being lifted due to collision with a foreign object which would be in contact with the inner side of the head. Therefore, the RFID structure is firmly attached on the object along with the main body.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
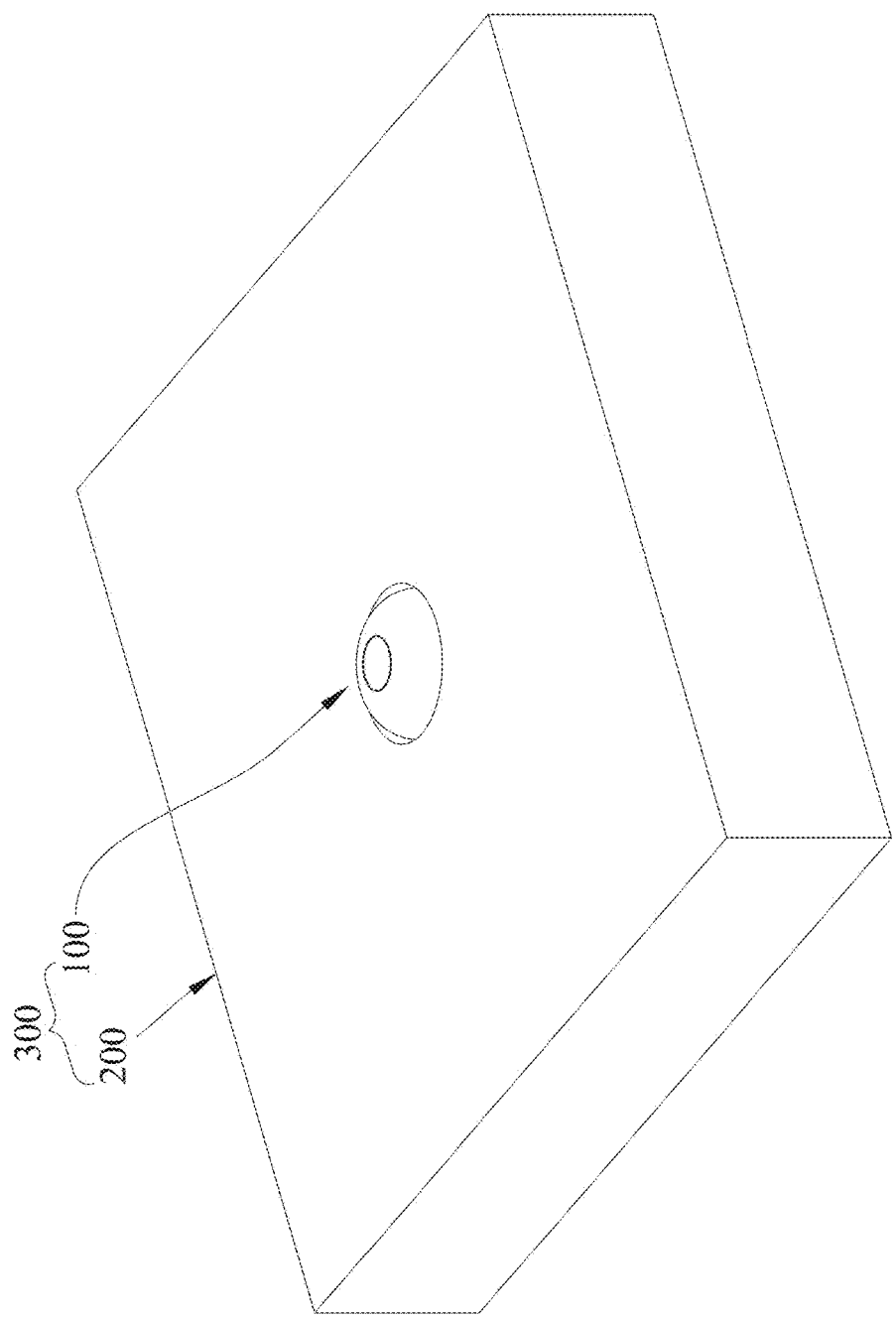
FIG. 1 is a perspective view of the RFID assembly according to an embodiment of the present invention.
Figure 2:
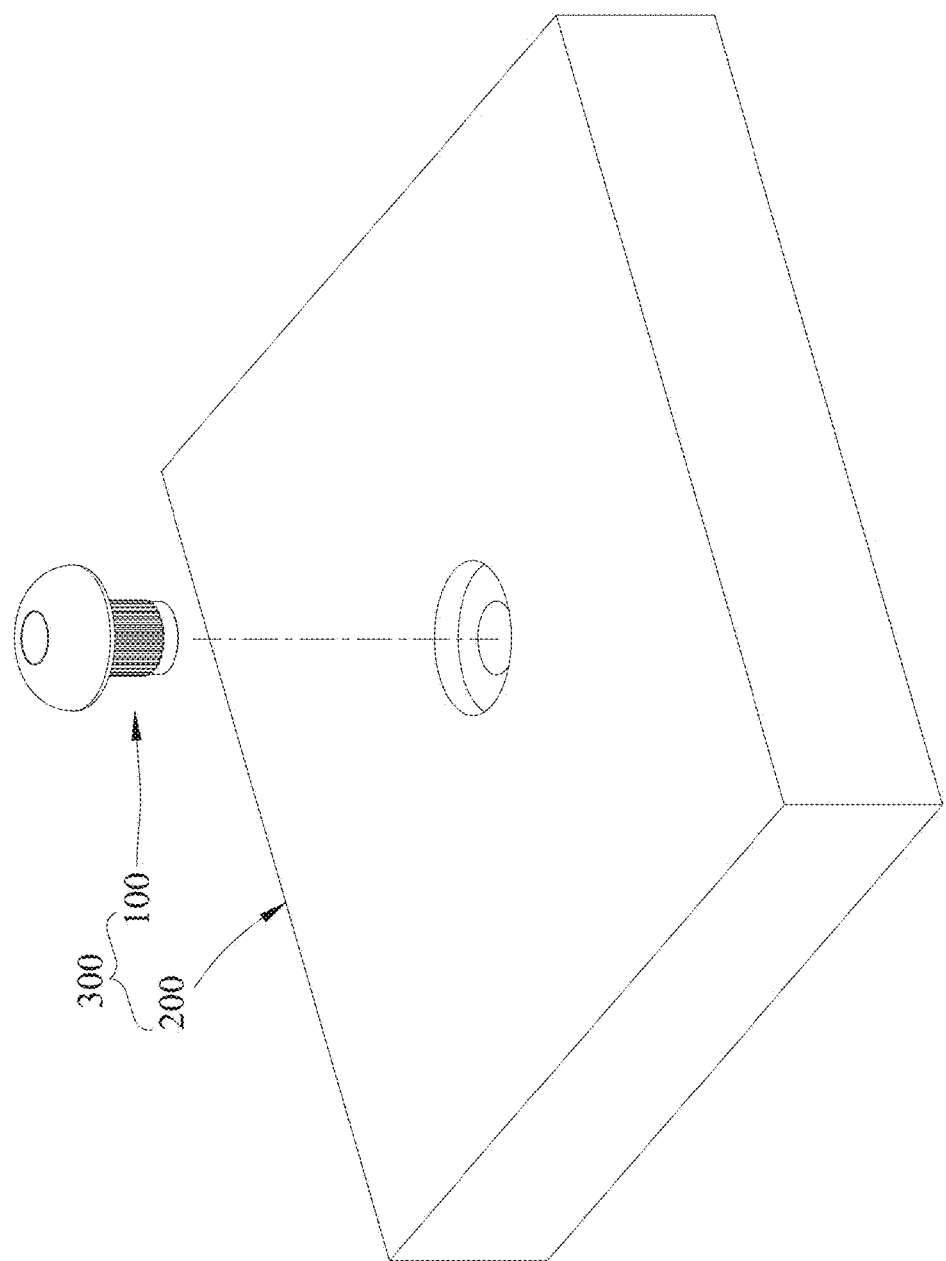
FIG. 2 is an exploded view of the RFID assembly according to the embodiment of the present invention.
Figure 3:
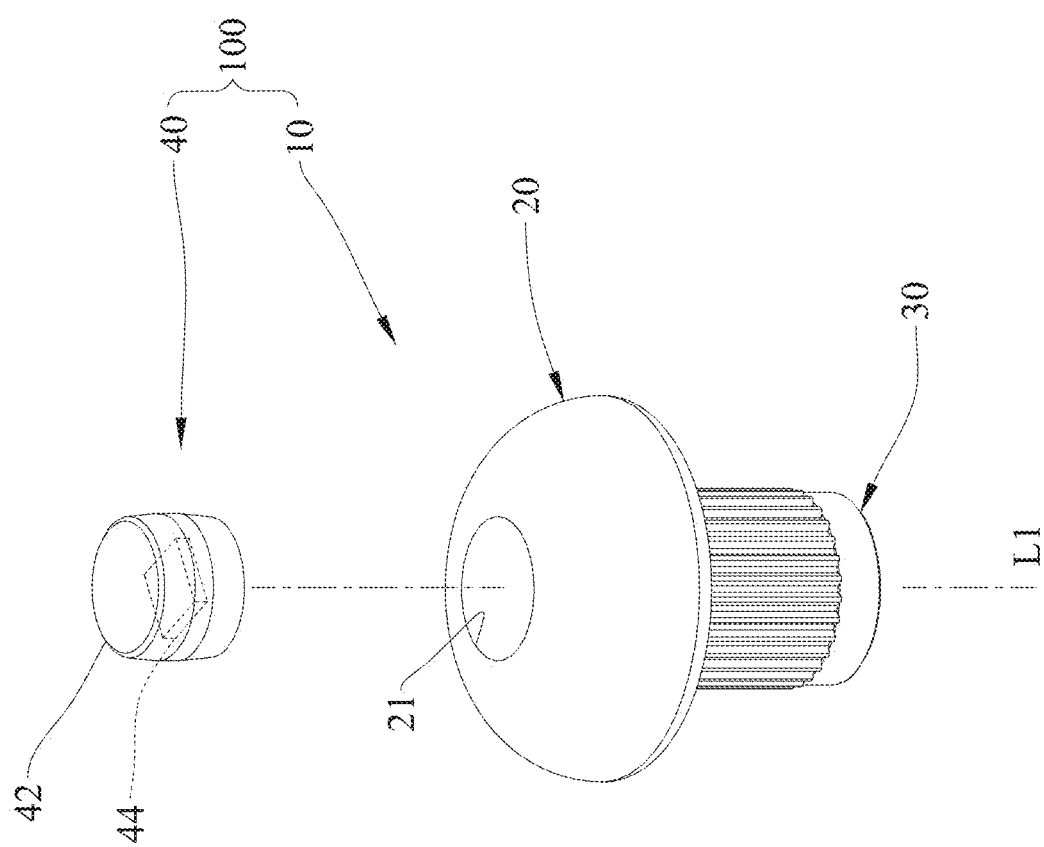
FIG. 3 is an exploded view of the RFID engagement device according to the embodiment of the present invention.
Figure 4:
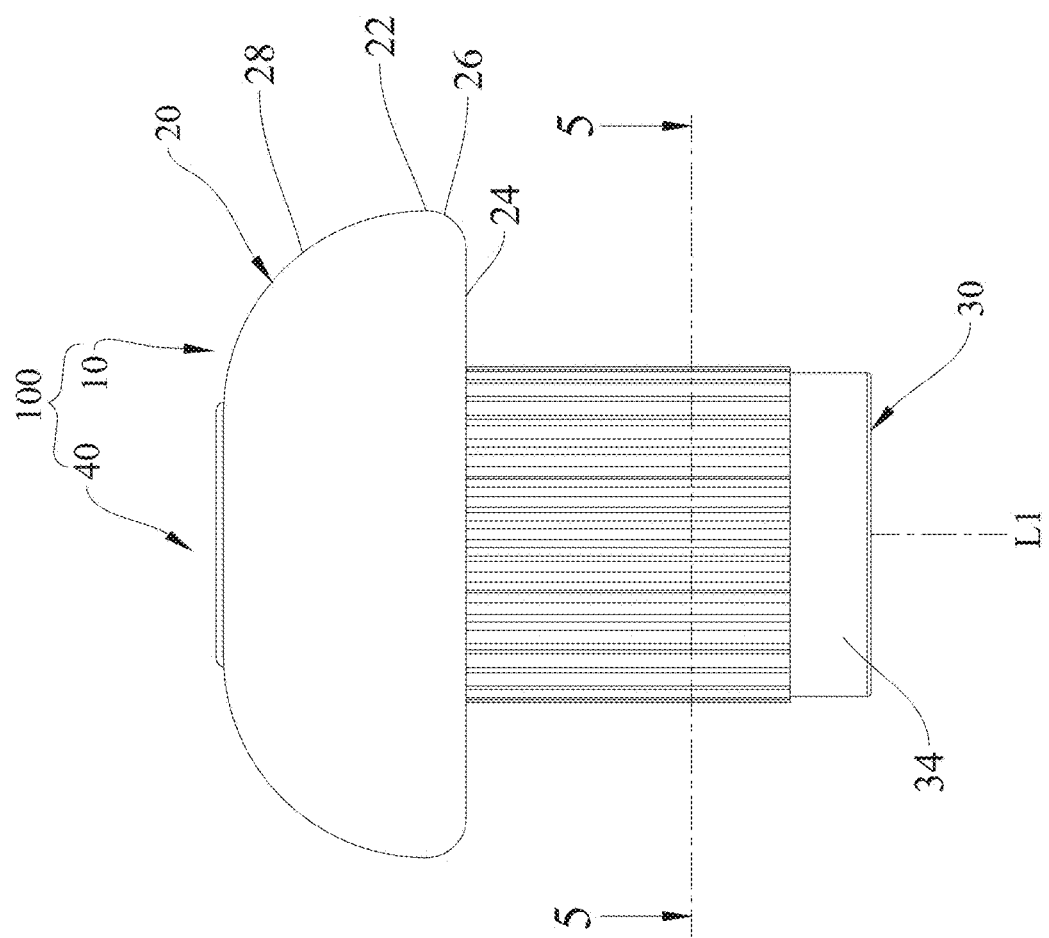
FIG. 4 is a front view of the RFID engagement device according to the embodiment of the present invention.
Figure 5:
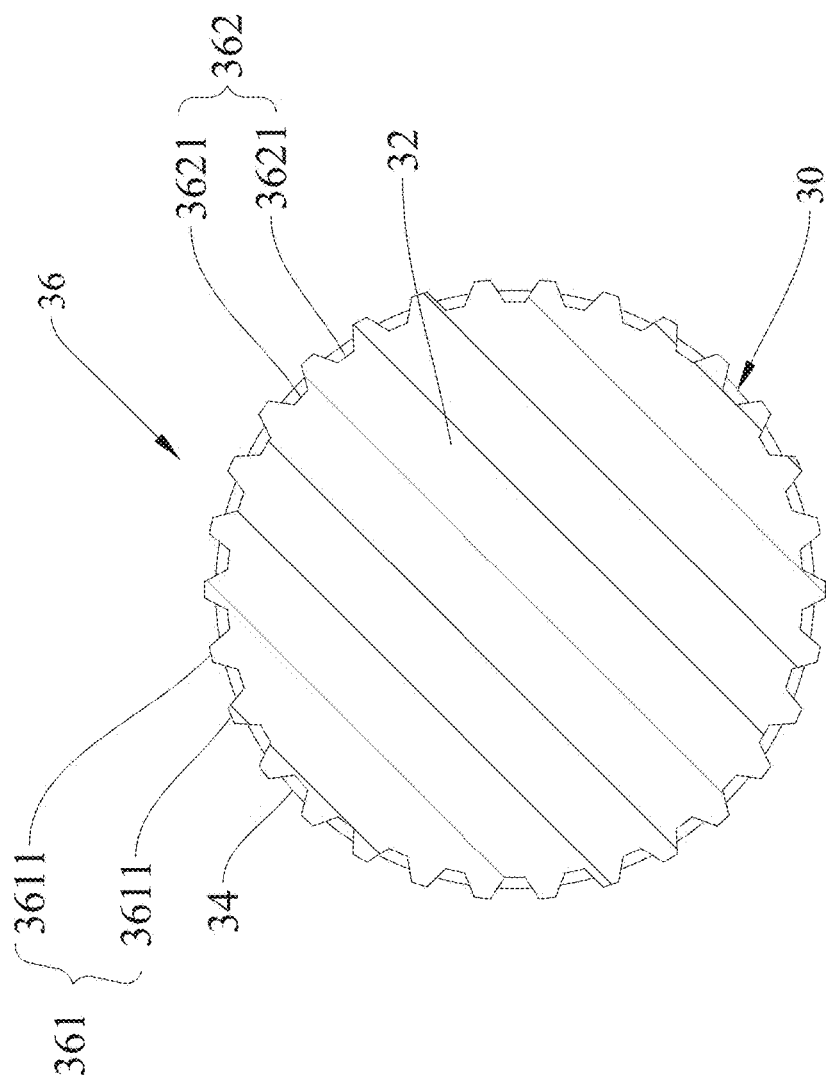
FIG. 5 is a sectional view along the 5-5 line in FIG. 4.
Figure 6:
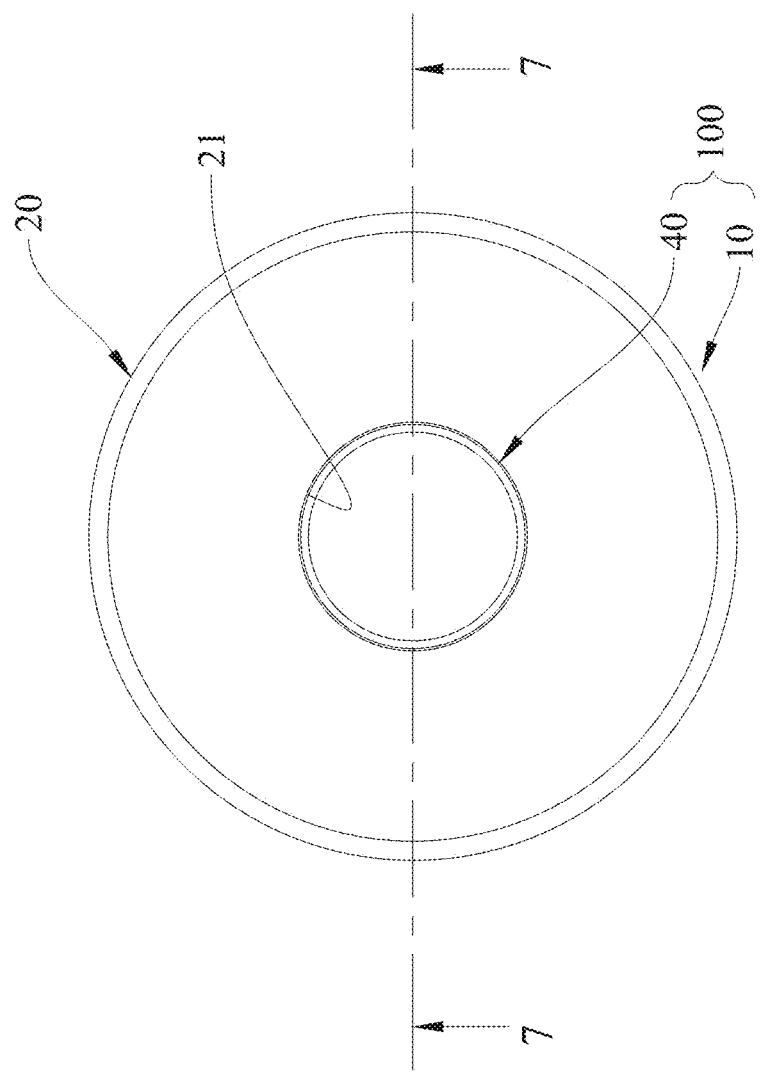
FIG. 6 is a top view of the RFID engagement device according to the embodiment of the present invention.
Figure 7:
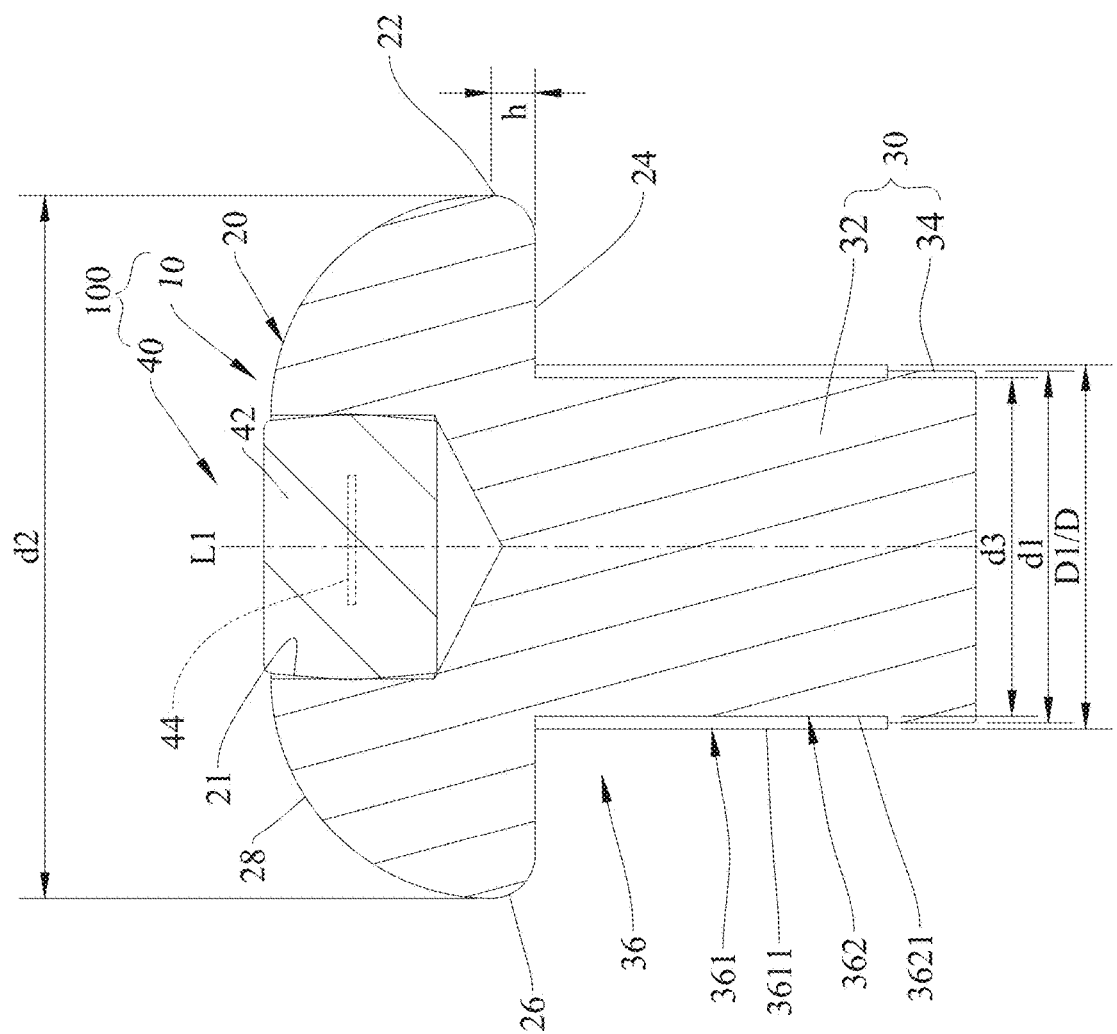
FIG. 7 is a sectional view along the 7-7 line in FIG. 6.
Figure 8:
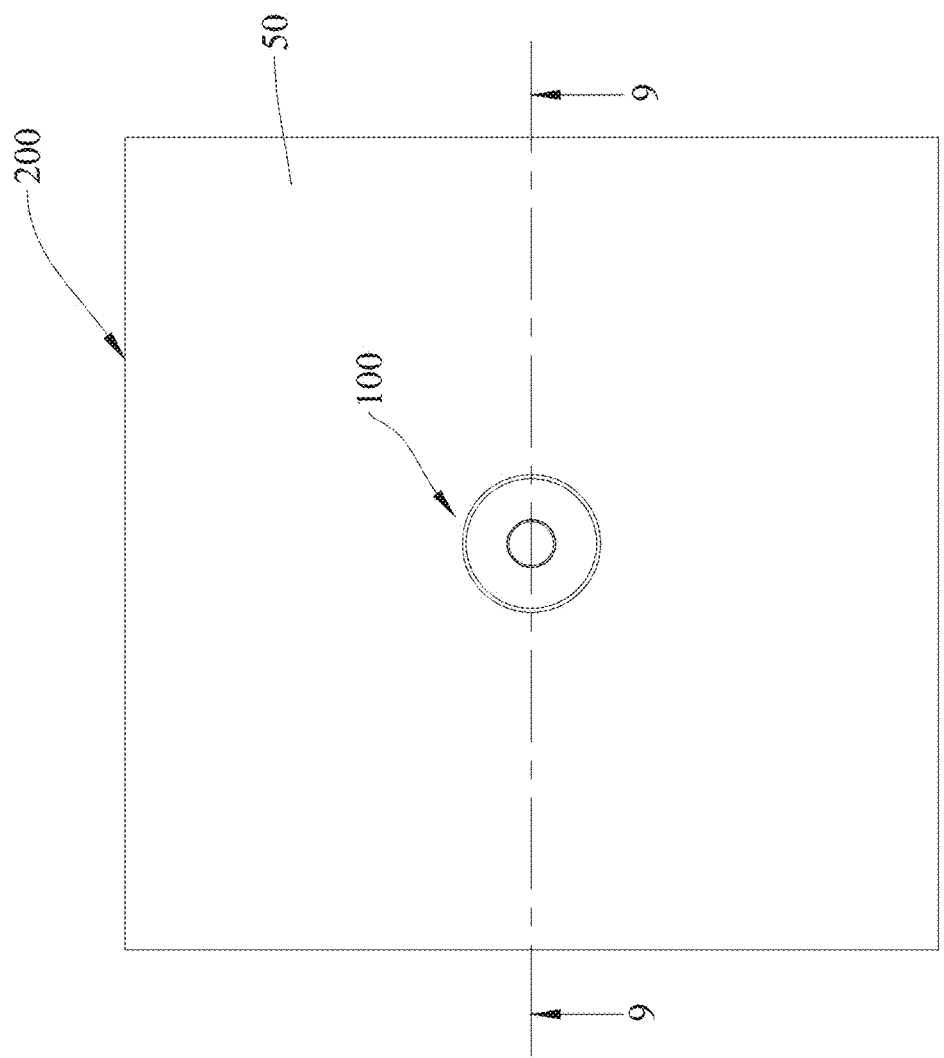
FIG. 8 is a top view of the RFID assembly according to the embodiment of the present invention.
Figure 9:
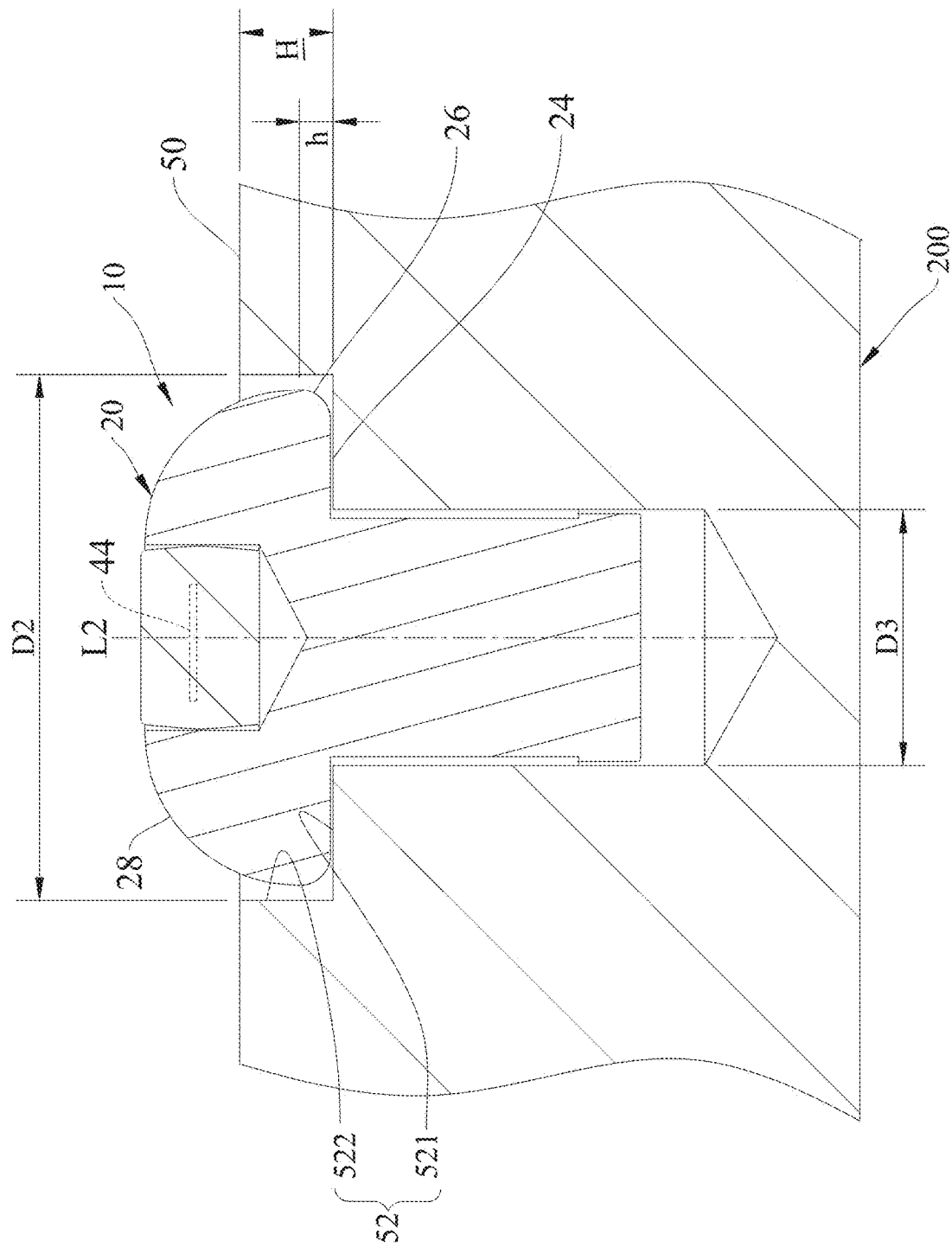
FIG. 9 is a sectional view along the 9-9 line in FIG. 8.
Figure 10:
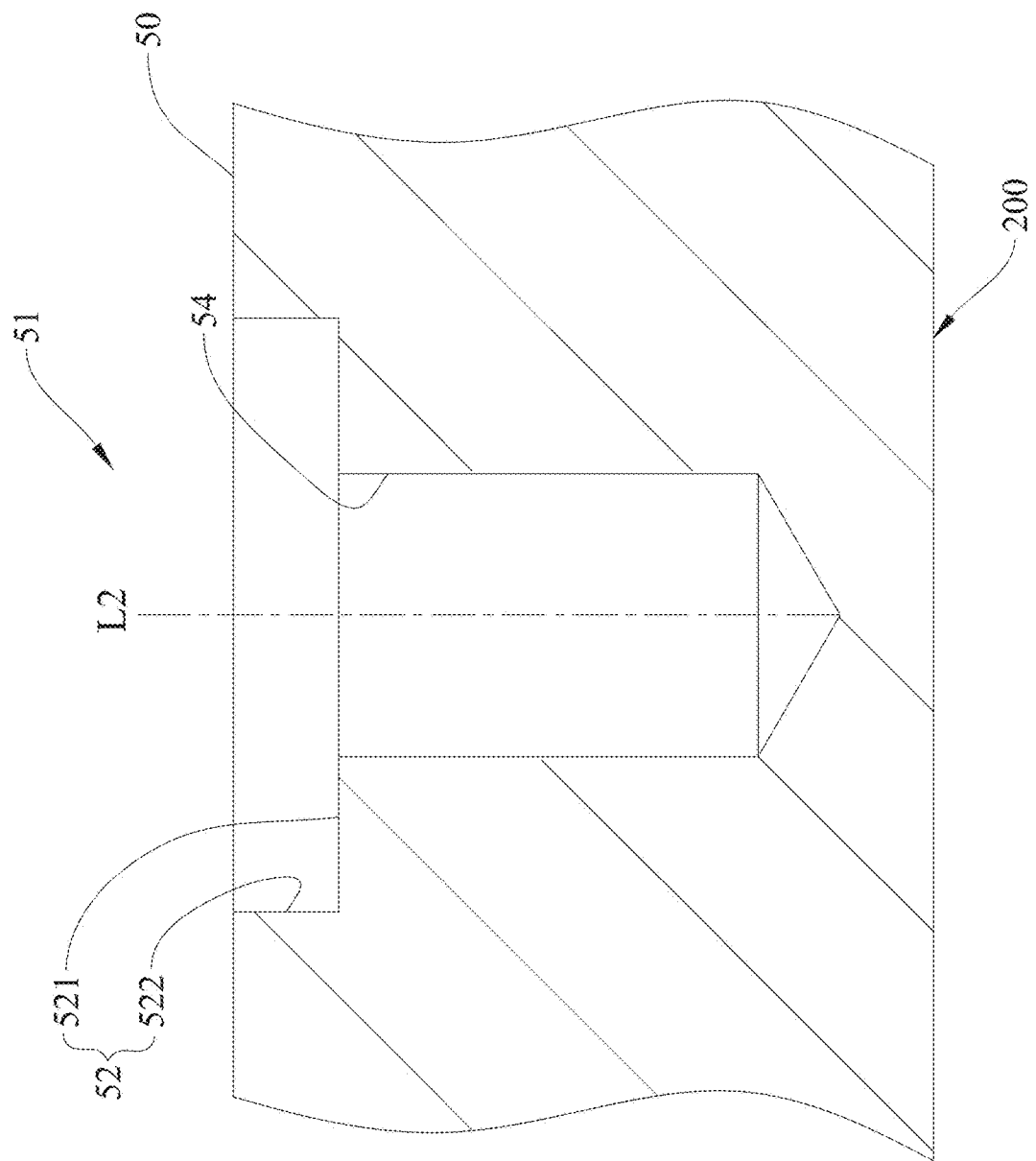
FIG. 10 is a sectional schematic view of the object in FIG. 9.
Figure 11:
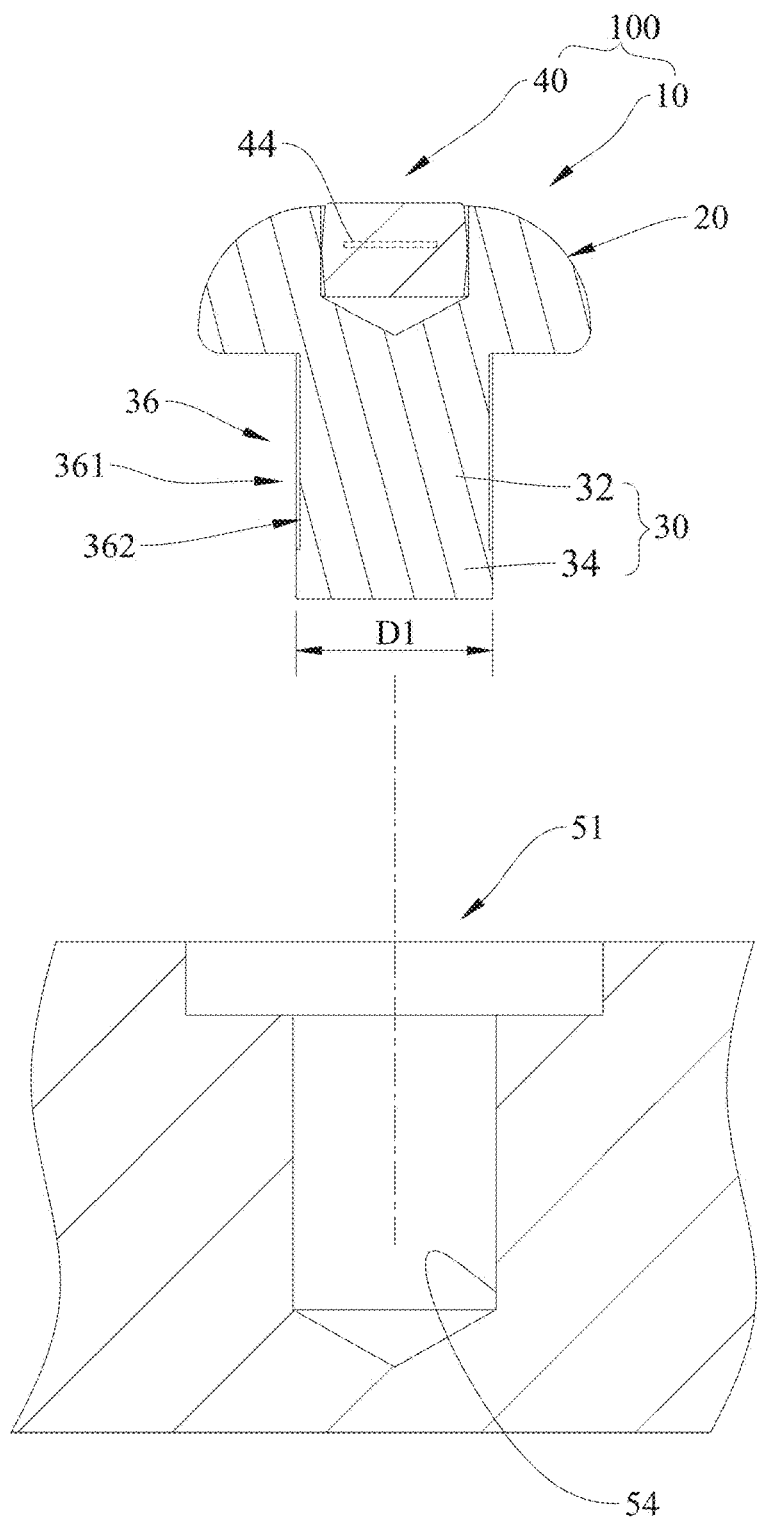
FIG. 11 is a sectional schematic view, showing that the RFID engagement device and the object in FIG. 9 are detached.

A RFID assembly 300 according to an embodiment of the present invention is illustrated in FIG. 1 and FIG. 2 and includes a RFID engagement device 100 and an object 200. The object 200 is adapted to engage with the RFID engagement device 100.

Referring to FIG. 3 to FIG. 7, the RFID engagement device 100 includes a main body 10 and a RFID structure 40. In the current embodiment, the main body 10 is made of metal and is flexible to a certain degree. The main body 10 has an axial line L1 and includes a head 20 and a body 30 that are connected to each other along the axial line L1. A peak 22 is provided around the head 20, wherein the peak 22 is the most protruding portion of the head 20. A diameter d2 of the peak 22 is a diameter d2 of the head 20.

A part of the head 20 adjacently connected to the body 30 forms an annular surface 24. The annular surface 24 is connected to the body 30 and is substantially perpendicular to the axial line L1. A periphery of a side of the head 20 close to the body 30 forms a recessed surface 26. The recessed surface 26 is connected between the peak 22 and the annular surface 24. An outer diameter of the recessed surface 26 gradually decreases from the peak 22 to the annular surface 24. Another side of the head 20 away from the body 30 has a curved top surface 28. The axial line L1 passes through a center of the curved top surface 28. A peripheral edge of the curved top surface 28 is connected to the peak 22. The center of the curved top surface 28 forms a receiving groove 21. In the current embodiment, the receiving groove 21 is a circular groove. In other embodiments, the receiving groove 21 could be a polygonal groove. A length between the peak 22 and the annular surface 24 in the axial line L1 is a peak height h. A length between the center of the curved top surface 28 and the annular surface 24 in the axial line L1 is greater than the peak height h.

The body 30 is a cylinder and includes a first section 32 and a second section 34 that are connected to each other. The first section 32 is connected between the head 20 and the second section 34 in a coaxial manner with the axial line L1. A length of the first section 32 in the axial line L1 is greater than a length of the second section 34 in the axial line L1. A concave-convex pattern 36 is provided around the first section 32. The concave-convex pattern 36 includes a protrusion 361 and a recess 362. A maximum outer diameter D1 of the protrusion 361 of the concave-convex pattern 36 is a maximum diameter D of the body 30. The maximum diameter D of the body 30 is less than the diameter d2 of the head 20. When the protrusion 361 is compressed by an external force, the protrusion 361 is forced to deform towards the recess 362, thereby elastically reducing the maximum outer diameter D1 of the protrusion 361.

In the current embodiment, the protrusion 361 includes a plurality of protruding ribs 3611. The protruding rib 3611 are arranged at intervals and are formed around the first section 32. An extension direction of the protruding ribs 3611 is parallel to the axial line L1. The recess 362 includes a plurality of grooves 3621. Each of the grooves 3621 is formed between two adjacent protruding ribs 3611 of the protruding ribs 3611. An extension direction of the grooves 3621 is parallel to the axial line L1. Outer surfaces of the protruding ribs 3611 could be virtually connected to form a cylindrical contour. Inner surfaces of the grooves 3621 could be virtually connected to form another cylindrical contour with a diameter less than a diameter of the cylindrical contour of the protruding ribs 3611.

The maximum outer diameter D1 of the protruding ribs 3611, i.e., the maximum outer diameter D1 of the protrusion 361 of the concave-convex pattern 36, is greater than a diameter d1 of the second section 34. A minimum inner diameter d3 of the grooves 3621, i.e., the minimum inner diameter d3 of the recess 362 of the concave-convex pattern 36, is less than the diameter d1 of the second section 34. In the current embodiment, the protrusion 361 includes the plurality of protruding ribs 3611 and the recess 362 includes the plurality of grooves 3621. In other embodiments, the protrusion 361 could be a plurality of protruding ribs arranged in a mesh-like structure and the recess 362 could be a plurality of grooves distributed on the mesh-like protruding ribs.

In the current embodiment, the maximum outer diameter D1 of the protrusion 361 of the concave-convex pattern 36 is 8.3 mm, and the diameter d1 of the second section 34 is 8 mm. In other embodiments, the maximum outer diameter D1 of the protrusion 361 of the concave-convex pattern 36 could be greater than or equal to 8.1 mm and is less than or equal to 8.5 mm. If the maximum outer diameter D1 of the protrusion 361 is too large, the first section 32 could not be inserted into a hole when the second section 34 and the first section 32 of the body 30 are inserted into the hole in sequence. If the maximum outer diameter D1 of the protrusion 361 is too small, the first section 32 might be easily detached from the hole after being inserted into the hole. In order to prevent the aforementioned conditions, a ratio of the maximum outer diameter D1 of the protrusion 361 of the concave-convex pattern 36 to the diameter d1 of the second section 34 in the present invention is greater than or equal to 1.0125 and is less than or equal to 1.0625. In this way, when the body 30 of the main body 10 is inserted into a hole, the protrusion 361 could tightly abut against an inner wall of the hole as the protruding ribs 3611 are compressed to deform, so that the main body 10 is firmly engaged with the hole.

The RFID structure 40 has an insulating carrier 42. In the current embodiment, the insulating carrier 42 is an elastic plastic block. The insulating carrier 42 encloses a RFID circuit module 44. The RFID circuit module 44 includes a RFID chip and an antenna electrically connected to the RFID chip. The RFID circuit module 44 is configured to store information that is readable by a RFID read/write device, such as information related to an identity of the object 200 with the RFID engagement device 100. When the RFID structure 40 is engaged with the main body 10, the insulating carrier 42 fits into the receiving groove 21 of the main body 10 for fixing.

Referring to FIG. 7 to FIG. 11, the object 200 could be a hand tool, a part of a machine apparatus, a fixed object, or other objects. The object 200 is adapted to engage with the main body 10 of the RFID engagement device 100, so that the RFID structure 40 could be attached on the object 200. The object 200 has a surface 50. The surface 50 has an engagement hole 51. The engagement hole 51 is for the main body 10 to insert and fix. The engagement hole 51 has a hole axis L2 and includes an expanded portion 52 and an insertion portion 54 that are connected to each other along the hole axis L2. The expanded portion 52 is adjacently connected to the surface 50. A diameter D2 of the expanded portion 52 is greater than a diameter D3 of the insertion portion 54. The expanded portion 52 has a hole surface 521 and a circular wall 522 connected to a peripheral edge of the hole surface 521. The hole surface 521 is an annular flat surface and is perpendicular to the hole axis L2. The insertion portion 54 is formed on a middle of the hole surface 521.

In order to be inserted by the body 30 of the main body 10, a length of the insertion portion 54 in the hole axis L2 is greater than a length of the body 30 in the axial line L1, and the diameter D3 of the insertion portion 54 is equal to or slightly greater than the diameter d1 of the second section 34 of the body 30. For example, in the current embodiment, the diameter D3 of the insertion portion 54 ranges between the maximum outer diameter D1 of the protrusion 361 of the concave-convex pattern 36 and the diameter d1 of the second section 34. A length H between the surface 50 and the hole surface 521 in the hole axis L2 is greater than the peak height h. The diameter D2 of the expanded portion 52, i.e., the diameter D2 of the circular wall 522, is greater than the diameter d2 of the head 20. Preferably, a ratio of the diameter D2 of the expanded portion 52 (i.e., the diameter D2 of the circular wall 522) to the diameter d2 of the head 20 is greater than or equal to 1.0312 and is less than or equal to 1.0625.

When the main body 10 is inserted into the engagement hole 51 of the object 200, the length of the insertion portion 54 in the hole axis L2 is greater than the length of the body 30, and the diameter D2 of the circular wall 522 is greater than the diameter d2 of the head 20. In this way, the body 30 could be inserted into the insertion portion 54, and a part of the head 20 adjacently connected to the body 30 is placed in the expanded portion 52. While the second section 34 and the first section 32 of the main body 10 are inserted into the insertion portion 54 in sequence, the protruding ribs 3611 of the protrusion 361 are compressed by a hole wall of the insertion portion 54 to deform towards the grooves 3621. In this way, when the body 30 of the main body 10 is completely inserted into the insertion portion 54, the protruding ribs 3611 could tightly abut against the hole wall of the insertion portion 54 for fixing, so that the main body 10 would not be easily detached from the engagement hole 51 of the object 200.

The effect of the size ratio of the concave-convex pattern 36 to the second section 34 of the main body 10 is explained in the following. The ratio of the maximum outer diameter D1 of the protrusion 361 of the concave-convex pattern 36 to the diameter d1 of the second section 34 is greater than or equal to 1.0125 and is less than or equal to 1.0625. When maximum outer diameter D1 of the protrusion 361 of the concave-convex pattern 36 is too small, the fixing effect of inserting the body 30 into the engagement hole 51 would be poor. When the maximum outer diameter D1 of the protrusion 361 of the concave-convex pattern 36 is too large, the protruding ribs 3611 of the protrusion 361 would not be easily deformed and hence it is difficult to insert the body 30 into the insertion portion 54.

The effect of the size ratio of the head 20 of the main body 10 to the expanded portion 52 is explained in the following. After the head 20 is placed in the expanded portion 52, the annular surface 24 abuts against the hole surface 521. The diameter D2 of the circular wall 522 is slightly greater than the diameter d2 of the head 20. In this way, the head 20 is sunk in the surface 50 and is surrounded by the circular wall 522. When a foreign object collides with the head 20, the foreign object could be in contact only with an outer side of the head 20 without being in contact with a peripheral edge of the annular surface 24. For example, the foreign object could be in contact only with a part of the curved top surface 28. Therefore, the main body 10 could remain at a position of being inserted into the engagement hole 51 and the head 20 of the main body 10 would not be lifted due to the collision with the foreign object. Moreover, the length H between the surface 50 and the hole surface 521 in the hole axis L2 is greater than the peak height h, so that the recessed surface 26 is located in the expanded portion 52, thereby preventing the head 20 from being lifted from the recessed surface 26 due to the collision with the foreign object. In this way, after the main body 10 is inserted into the engagement hole 51 of the object 200, the RFID structure 40 fixed on the main body 10 could be properly attached on the object 200, and the RFID circuit module 44 in the RFID structure 40 could be provided for the RFID read/write device to write or read information.

In the current embodiment, the head 20 is a circular block and the expanded portion 52 is a circular groove. In another embodiment, the head could be a polygonal block and the expanded portion could be a polygonal groove. In the another embodiment, the preferable ratio of the diameter of the expanded portion (the diameter of the circular wall) to the diameter of the head is greater than or equal to 1.0312 and is less than or equal to 1.0625. The diameter of the head is a diameter of a circumcircle of the head. The diameter of the expanded portion (the diameter of the circular wall) is a diameter of a circumcircle of the expanded portion (a diameter of a circumcircle of the circular wall).

It must be pointed out that the embodiment described above is only a preferred embodiment of the present invention. All equivalent structures which employ the concepts disclosed in this specification and the appended claims should fall within the scope of the present invention.

What is claimed is:

1. A RFID assembly, comprising:
a RFID engagement device, comprising a main body and
a RFID structure, wherein the main body has an axial line and comprises a head and a body that are connected to each other along the axial line; the head has a receiving groove; the RFID structure has an insulating carrier; the insulating carrier fits into the receiving groove and encloses a RFID circuit module; and
an object, having a surface, wherein the surface has an engagement hole; the engagement hole has a hole axis and comprises an expanded portion and an insertion portion that are connected to each other along the hole axis; the expanded portion is adjacently connected to the surface; the body of the main body is inserted into the insertion portion; the head is at least partially placed in the expanded portion; a ratio of a diameter of the expanded portion to a diameter of the head is greater than or equal to 1.0312 and is less than or equal to 1.0625;
wherein the body is a cylinder and comprises a first section and a second section that are connected to each other; the first section is connected between the head and the second section; a concave-convex pattern is provided around the first section; a maximum outer diameter of the concave-convex pattern is greater than a diameter of the second section.

2. The RFID assembly as claimed in claim 1, wherein the expanded portion has a hole surface and a circular wall connected to a peripheral edge of the hole surface; the insertion portion is formed on a middle of the hole surface; a part of the head adjacently connected to the body forms an annular surface; the annular surface abuts against the hole surface.

3. The RFID assembly as claimed in claim 2, wherein a peak is formed around a part of the head that is the most protruding; the head has a recessed surface; the recessed surface is connected between the peak and the annular surface; an outer diameter of the recessed surface gradually decreases from the peak to the annular surface.

4. The RFID assembly as claimed in claim 3, wherein a length between the peak and the annular surface in the axial line is a peak height; a length between the surface and the hole surface in the hole axis is greater than the peak height.

5. The RFID assembly as claimed in claim 3, wherein the head has a curved top surface; a peripheral edge of the curved top surface is connected to the peak; the receiving groove is formed on a center of the curved top surface.

6. The RFID assembly as claimed in claim 1, wherein a ratio of the maximum outer diameter of the concave-convex pattern to the diameter of the second section is greater than or equal to 1.0125 and is less than or equal to 1.0625.

7. The RFID assembly as claimed in claim 6, wherein the maximum outer diameter of the concave-convex pattern is greater than or equal to 8.1 mm and is less than or equal to 8.5 mm.

8. The RFID assembly as claimed in claim 1, wherein the concave-convex pattern comprises a protrusion and a recess; the maximum outer diameter of the protrusion is greater than the diameter of the second section; a minimum inner diameter of the recess is less than the diameter of the second section.

9. The RFID assembly as claimed in claim 8, wherein the protrusion comprises a plurality of protruding ribs; the plurality of protruding ribs are arranged at intervals and are formed around the first section; an extension direction of the plurality of protruding ribs is parallel to the axial line; the recess comprises a plurality of grooves; each of the plurality of grooves is formed between two adjacent protruding ribs of the plurality of protruding ribs; an extension direction of the plurality of grooves is parallel to the axial line.

* * * * *